(12) United States Patent
Lessway

(10) Patent No.: US 6,699,113 B2
(45) Date of Patent: Mar. 2, 2004

(54) STEADY REST WITH VERTICAL ADJUSTMENT

(75) Inventor: Richard J. Lessway, Farmington Hills, MI (US)

(73) Assignee: Arobotech Systems, Inc., Madison Heights, MI (US)

( * ) Notice: Subject to any disclaimer, the term of this patent is extended or adjusted under 35 U.S.C. 154(b) by 203 days.

(21) Appl. No.: 09/975,692

(22) Filed: Oct. 12, 2001

(65) Prior Publication Data

US 2003/0077994 A1 Apr. 24, 2003

(51) Int. Cl.$^7$ .............................................. B24B 41/06
(52) U.S. Cl. ...................................... 451/408; 451/406
(58) Field of Search ................................. 451/408, 242, 451/244, 49, 407; 82/157, 164, 162

(56) References Cited

U.S. PATENT DOCUMENTS

| | | | |
|---|---|---|---|
| 4,399,639 A | | 8/1983 | Lessway ....................... 51/238 |
| 4,519,279 A | * | 5/1985 | Ruggeri ....................... 82/38 R |
| 4,647,097 A | | 3/1987 | Lessway ....................... 294/88 |
| 4,647,100 A | | 3/1987 | Lessway ................... 294/119.1 |
| 4,650,237 A | * | 3/1987 | Lessway ....................... 82/38 R |
| 5,058,468 A | | 10/1991 | Lessway ....................... 82/157 |
| 5,237,780 A | | 8/1993 | Lessway ....................... 51/238 |
| 5,285,599 A | | 2/1994 | Lessway ....................... 51/289 |

* cited by examiner

Primary Examiner—Robert A. Rose
(74) Attorney, Agent, or Firm—Charles W. Chandler

(57) ABSTRACT

A steady rest having cams for adjusting both vertical and the horizontal position of the centerline of a cylindrical workpiece.

10 Claims, 5 Drawing Sheets

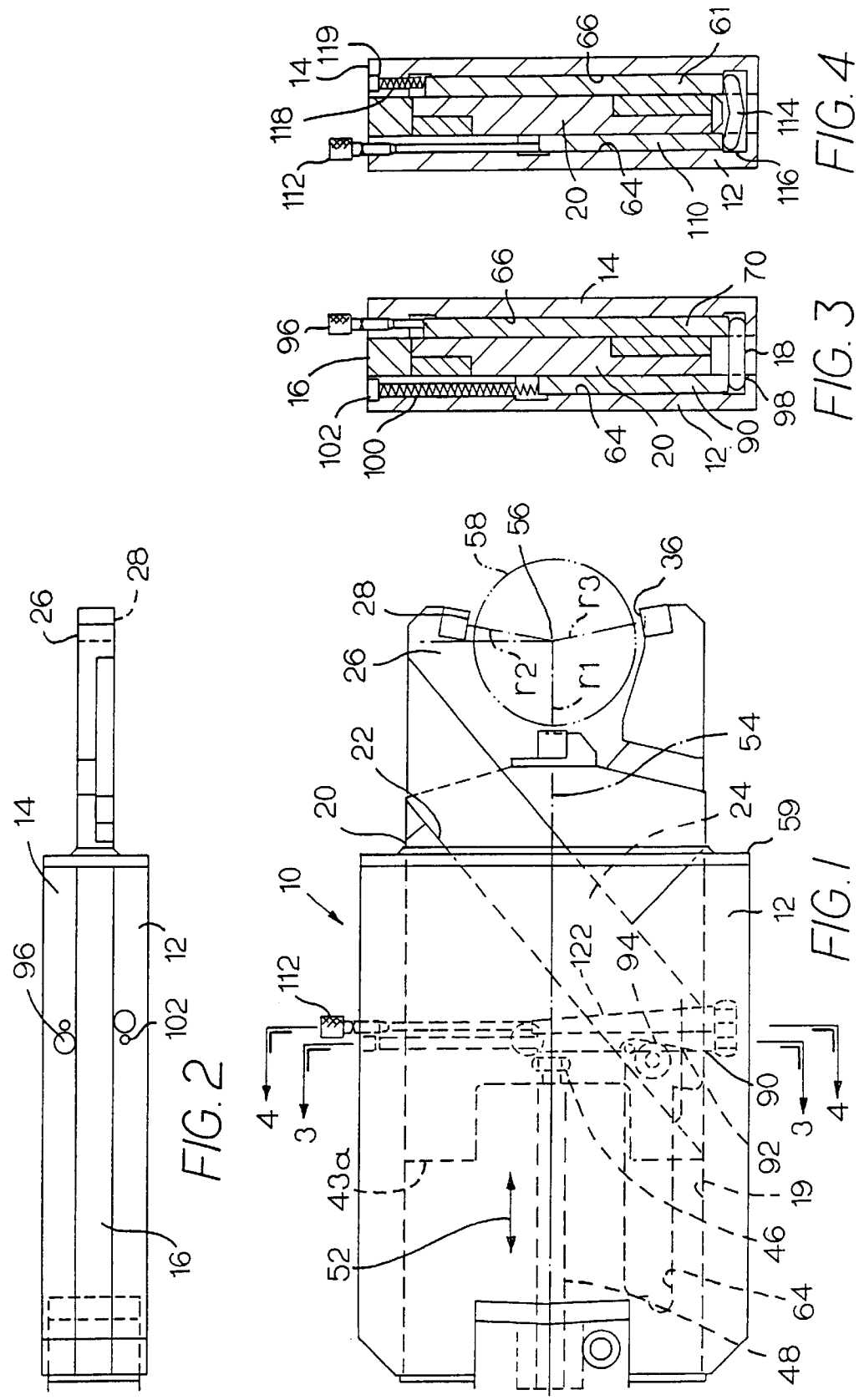

STEADY REST WITH VERTICAL ADJUSTMENT

BACKGROUND AND SUMMARY OF THE INVENTION

This invention relates to steady rests employed to support a cylindrical workpiece for precision machining or grinding. More specifically, this invention relates to a multi-point, true centering steady rest having an internal camming device for adjusting the position of a supported workpiece, both horizontally and vertically.

Steady rests are commonly used to support rotatable cylindrical workpieces for machining or grinding. Steady rests may be found in several of my prior United States patent, including: U.S. Pat. No. 5,285,599 issued Feb. 15, 1994, for "Method for Adjusting a Steady Rest having an Internal Centerline Adjustment; U.S. Pat. No. 5,237,780 issued Aug. 24, 1993 for "Steady Rest with Internal Centerline Adjustment"; U.S. Pat. No. 5,058,468 issued Oct. 22, 1991 for "Remote Gage Steady Rest Head"; U.S. Pat. No. 4,647,100 issued Mar. 3, 1987 for "Parallel Gripper with Roller Supported Gripper Arms"; U.S. Pat. No. 4,647,097 issued Mar. 3, 1987 for "I.D. or O.D. Parallel Gripper"; and U.S. Pat. No. 4,399,639 issued Aug. 23, 1983 for "True Centering Steady Rest".

Typically, a steady rest includes a housing mounted on a suitable base adjacent the workpiece. A body in the housing is slidably movable toward or away from the horizontal axis (centerline) of the workpiece, by a hydraulic cylinder. Gripping arms are slidably mounted in a crisscross pattern on the body and move with the body. A wear pad is attached to the outer ends of each of the two arms, and a third wear pad is attached to the body. An internal adjustment means permits the three wear pads to cooperate in providing a three-point gripping arrangement for the workpiece as it is being rotated.

For a variety of reasons explained in my prior patents, the axis of the rotating workpiece may shift a small distance either horizontally or vertically. My prior patents disclose means for adjusting the wear pad locations for a horizontal change in the workpiece axis, without adjusting the steady rest housing.

A need exists for means for making a vertical adjustment of the wear pads without having to adjust the position of the entire steady rest.

The broad purpose of the present invention is to provide an internal camming device for adjusting the vertical position of the wear pads. A preferred steady rest has two internal adjustment features. A vertical adjusting screw permits the user to move a pair of internal, wedge-shaped guides engaging a cam follower carried on each of the gripper arms. The adjusting screw moves one of the guides to an adjusted position. A rocker arm moved by the first guide moves the second guide that cams the second arm. The two guides move in opposite directions along their respective camming surfaces. The result is that the wear pad on one arm will advance horizontally further before it is cammed toward a work contact position. The second wear pad will not move as far forward before it moves toward its work contact position. The geometry of the flat work contact surface of the three wear pads and the cylindrical profile of the workpiece is such that the center of contact of the three wear pads can be adjusted without adjusting the position of the entire steady rest. Reversing the rotation of the adjusting screw adjusts the work contact position of the wear pads in the opposite vertical direction.

A second pair of wedge-shaped guide members, disposed in a side-by-side relationship with the first pair of guide members, engages the same cam followers carried by the two arms. A second, horizontal adjusting screw adjusts the guides to provide a horizontal change in the position of the three wear pads.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is an elevational view of a preferred steady rest, internal adjusting components being illustrated in phantom;

FIG. 2 is a plan view of the steady rest of FIG. 1;

FIG. 3 is a sectional view as seen along lines 3—3 of FIG. 1;

FIG. 4 is a sectional view as seen along lines 4—4 of FIG. 1;

FIG. 8 illustrates the near side guides in phantom. FIG. 9 illustrates the far side guides in phantom;

FIG. 12 shows the far side guides in phantom. FIG. 13 shows the near side guides in phantom.

DESCRIPTION OF THE PREFERRED EMBODIMENT

Referring to FIGS. 1–4, a preferred steady rest comprises a housing generally indicated at 10 having a pair of side plates 12 and 14. A top cover 16 is sandwiched and attached to the upper edges of the two side plates. A lower slide plate 18 is attached to the lower ends of the two side plates. Slide plate 18 has a planar sliding surface 19. The internal planar opposed surfaces of the side plates are parallel, one to the other.

Figure 5:
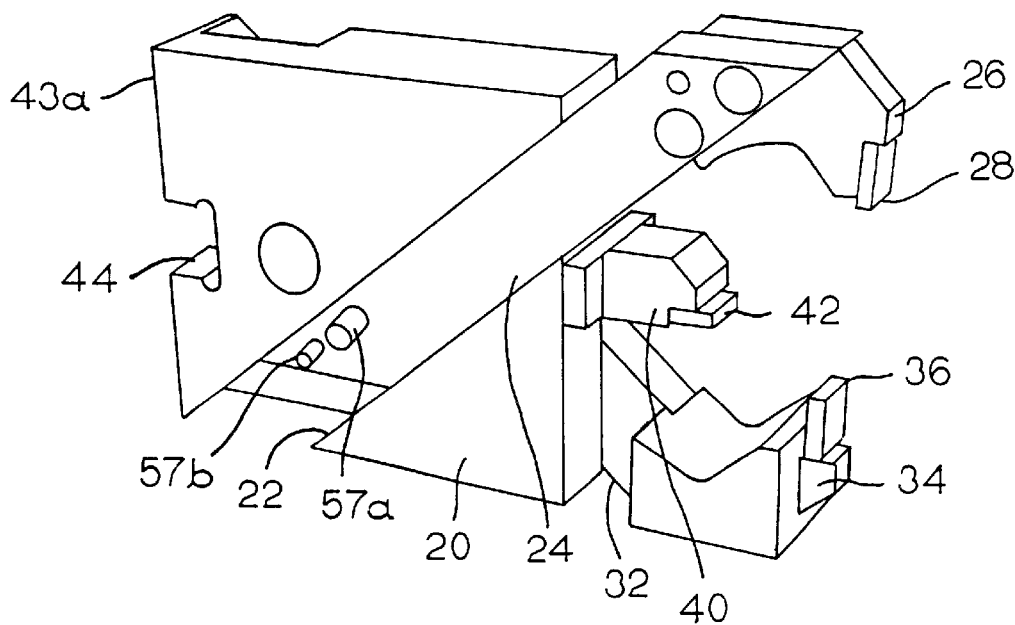
FIG. 5 is a view of the internal sliding body and the two gripping arms, separated from the housing.

A gripping arm-supporting body 20 is slidably mounted on sliding surface 19 between the two side plates. Referring to FIG. 5, one side of body 20 has a slot 22 disposed at about a 45° angle, for example, with respect to the plane of sliding surface 19. An elongated gripping arm 24 is slidably mounted in slot 22.

A wear-pad supporting structure 26, carried on the upper outer end of gripping arm 24, supports upper wear pad 28. Upper wear pad 28 has a flat work contact surface (FIG. 14) that lies in a plane 28a that is tangent to the cylindrical profile 29 of a workpiece.

Figure 6:
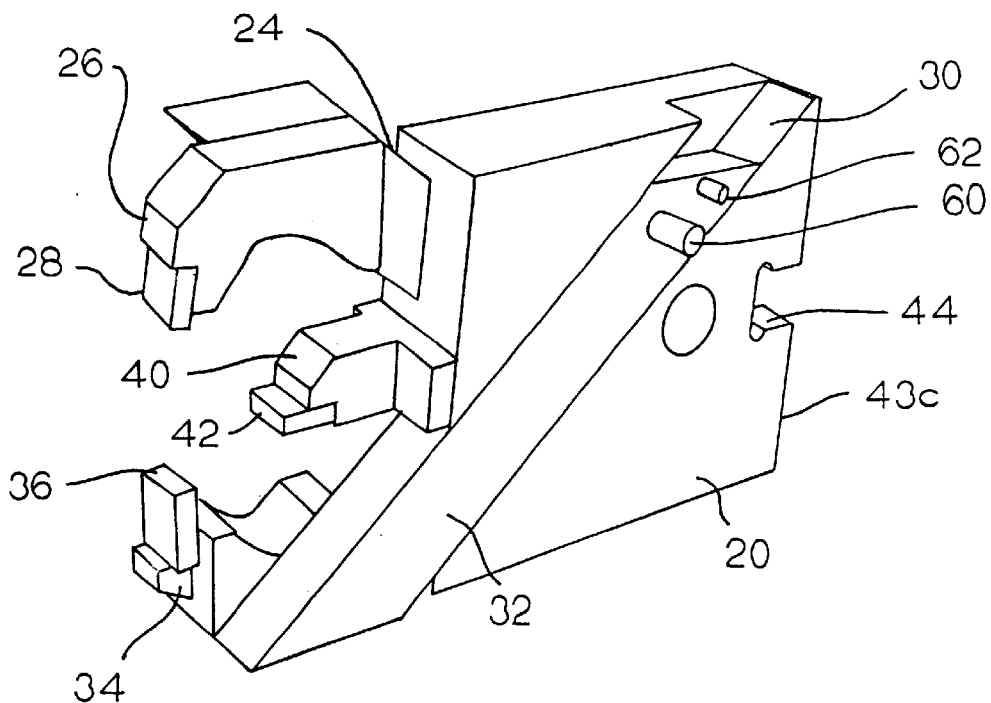
FIG. 6 is a view from the opposite side of the view of FIG. 5.
Figure 14:
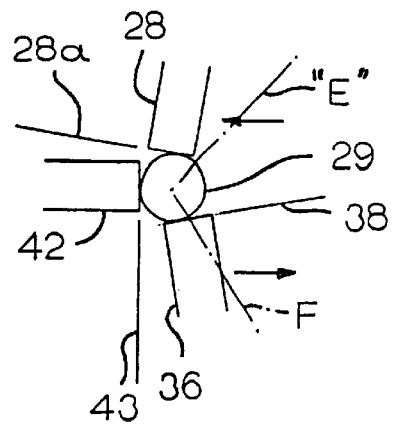
FIG. 14 illustrates the wear pad contact positions after a vertical adjustment.

Referring to FIG. 6, body 20 has a second slot 30 that extends at about a 45° angle with respect to sliding surface 19 of slide plate 18, and about 90° with respect to slot 22. A second gripping arm 32 is slidably mounted in slot 30. A wear-pad supporting structure 34 is attached in the usual manner to the lower outer end of gripping arm 32. Structure 34 supports a wear pad 36 having a flat work contact surface lying in a plane 38 that is also tangent to profile 29 of the workpiece (FIG. 14).

A third wear pad supporting structure 40 is attached to the front of body 20 and supports a center wear pad 42. Wear pad 42 has a flat work contact surface that lies in a plane 43 that is tangent to profile 29 of the workpiece.

Referring to FIG. 1, each of the three wear pads engages the workpiece profile such that a radius r1, r2 and r3 drawn from each contact point intersects the radius of the other wear pads at a common profile center. This profile center is adjusted to coincide with the actual center (axis) 56 of the workpiece.

As body 20 moves horizontally in housing 10, the three wear pads travel during a portion of their stroke in a horizontal direction. Gripping arms 24 and 32 are also slidably movable with respect to body 20 between retracted and work contact positions, which will be described in greater detail.

Referring to FIGS. 1, 5 and 6, the rear end 43a of body 20 has a notch 44 for engaging a connector 46 carried by a piston rod 48 of a hydraulic cylinder actuator 50. Actuator 50 can move the body in either forward or rearward directions as indicated by arrows 52, along a horizontal axis 54. The housing is initially positioned so that axis 54 intersects longitudinal (rotating) axis 56 of a horizontally supported cylindrical workpiece 58.

A wiper 59 is mounted around the opening through which body 20 slides. Referring to FIG. 5, the lower, rear end of gripping arm 24, carries a cam roller-supporting pin 57a. A camming pin 57b is mounted adjacent pin 57a. Both pins 57a and 57b are supported perpendicular to the internal planar surface of side plate 12.

Similarly, referring to FIG. 6, the upper, rear end of gripping arm 32 supports a cam roller-supporting pin 60. A camming pin 62 is mounted adjacent pin 60. Both pins 60 and 62 are supported perpendicular to the inner surface of side plate 14.

Figure 7:
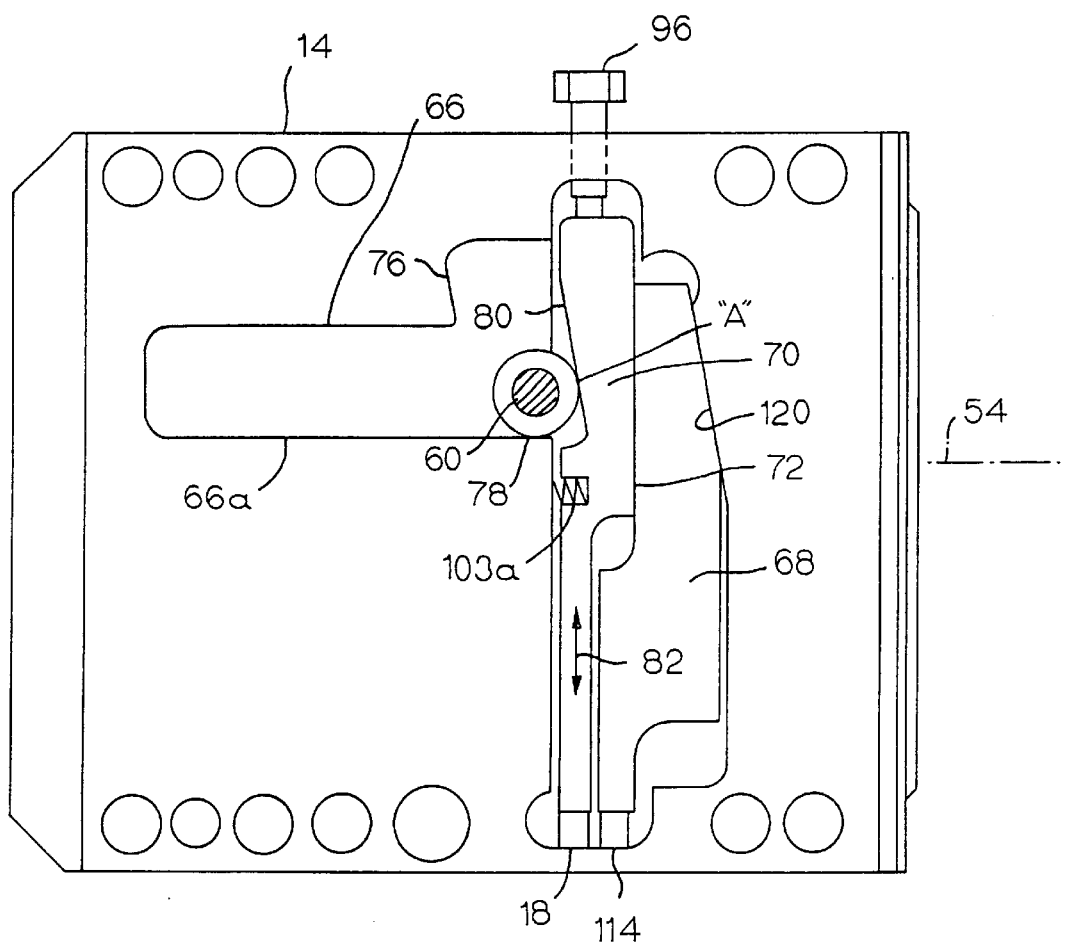
FIG. 7 is an enlarged sectional view showing the guide members in the camming slot of one of the housing side plates.

Referring to FIGS. 3, 4, and 7, side plate 12 has an internal recessed camming slot 64. Side plate 14 has an internal recessed camming slot 66.

FIG. 7 shows the internal face of side plate 14. Camming slot 66 has a horizontal section 66a that is parallel to axis 54. An elongated somewhat wedge-shaped vertical-adjusting guide 68, and an elongated horizontal-adjusting guide 70 are mounted in a side-by-side relationship in camming slot section 66b and are slidable in a plane 72 that lies perpendicular to axis 54. Camming slot 66 also has a notch 76 that extends upwardly from the right end of section 66a.

A cam roller 78 is rotatably mounted on pin 60. Gripping arm 32 moves horizontally with body 20, guided by the rolling motion of cam roller 78 in the horizontal section 66a of the camming slot. In this motion, arm 32 does not slide in slot 30. When arm 32 is in an extreme forward position, that is towards the right as viewed in FIG. 7, roller 78 engages a camming notch surface 80 in guide member 68 at a position "A". This position is associated with a retracted position of wear pad 36 carried by arm 32, that is, a position in which the wear pad is radially spaced from the surface of the workpiece.

As body 20 advances further toward the workpiece, cam roller 78 rolls up camming surface 80, camming the wear pad 36 towards a work contact position as arm 32 slides up and rearwardly in slot 30. Wear pad 36 moves along a path defined by camming surface 80, When pad 36 contacts the workpiece, the hydraulic actuator stalls and continues to apply pressure on the workpiece.

Figure 8:
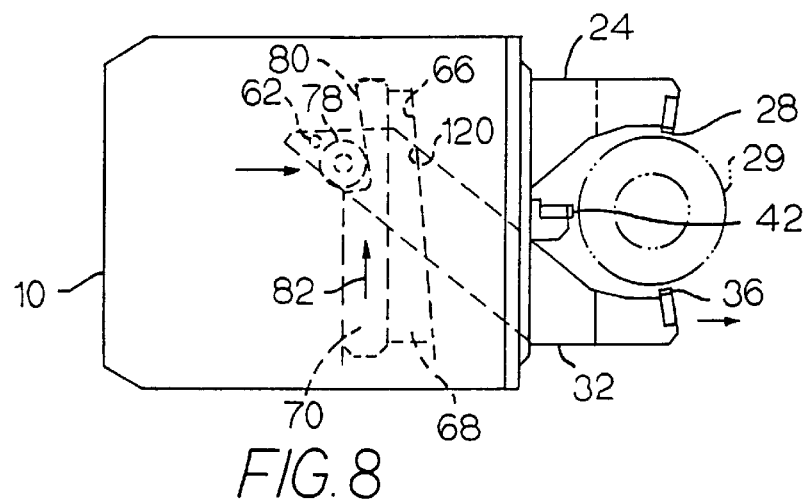
FIGS. 8 and 9 are diagrams illustrating the movement of the gripping arms for making a horizontal centerline adjustment.
Figure 9:
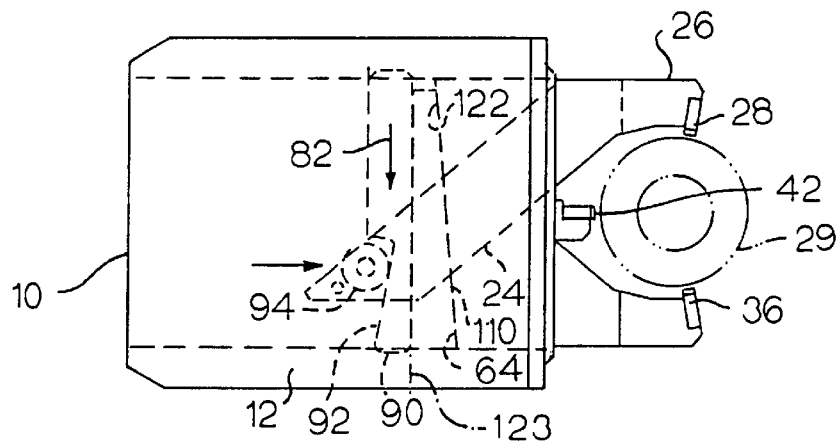

Referring to FIGS. 7, 8 and 9, moving horizontal-adjusting guide 70 in the direction of arrows 82, notch surface 80 moves the lower camming position of roller 78, and wear pad 36 in its fully retracted position either toward the left, or toward the right, horizontally adjusting this position of wear pad 36.

Referring to FIGS. 1 and 9, camming slot 64, shown in phantom, on the internal surface of side plate 12 is shaped similar to camming slot 66 and supports a similarly-shaped, vertically movable, horizontal-adjusting guide 90 having a notch 92. A cam roller 94 carried on pin 57a provides means for horizontally adjusting the work position of wear pad 28.

Cam roller 94 engages an elongated camming surface 92 that is inclined in the opposite direction with respect to camming surface 80. By vertically moving guide 90 in housing 10, a user can adjust the horizontal starting position of roller 94 as it is cammed downwardly, and thereby the fully retracted position of wear pad 28 in its stroke toward the workpiece.

Referring to FIGS. 3 and 7, a horizontal adjustment drive screw 96 mounted on side plate 14 engages the upper end of guide 70. The opposite end of guide 70 engages one end of a pivotal rocker arm 98. The opposite end of rocker arm 98 engages the lower end of guide 90 in such a manner that when guide 70 is lowered as viewed in FIG. 3, guide 90 is raised a similar distance.

A spring bias member 100 carried in side plate 12 is mounted between the upper end of guide 90 and a screw 102, to resiliently oppose the upward movement of guide 90. Thus, the two guides 70 and 90 move vertically in opposite directions. By adjusting drive screw 96, the user can move the camming notches of both guides 70 and 90 to horizontally shift the beginning of the lateral work contact stroke of wear pads 28 and 36.

Figure 10:
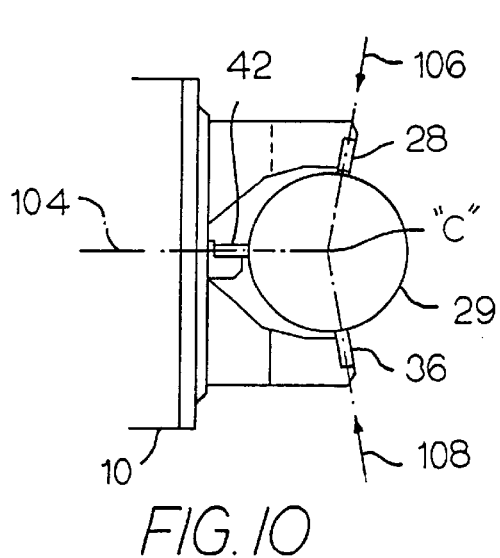
FIGS. 10 and 11 show the position of the wear pads before and after a horizontal adjustment from an original centerline to a new centerline.
Figure 11:
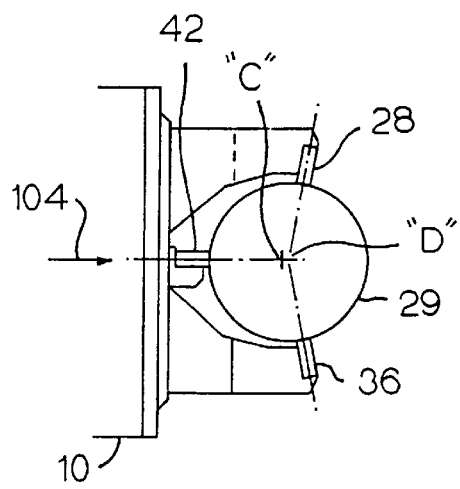

Referring to FIG. 7, a spring 103 biases guide 70 toward guide 90. Referring to FIGS. 10 and 11, by adjusting drive screw 96, the user moves the clamping center of the wear pads horizontally from an original position at "C" to a new position at "D". The wear pads are moved toward their respective work contact positions in the directions of arrows 104, 106 and 108. The wear pads are moved toward their respective retracted positions by moving body 20 in the opposite horizontal direction, that is toward the left.

Figure 12:
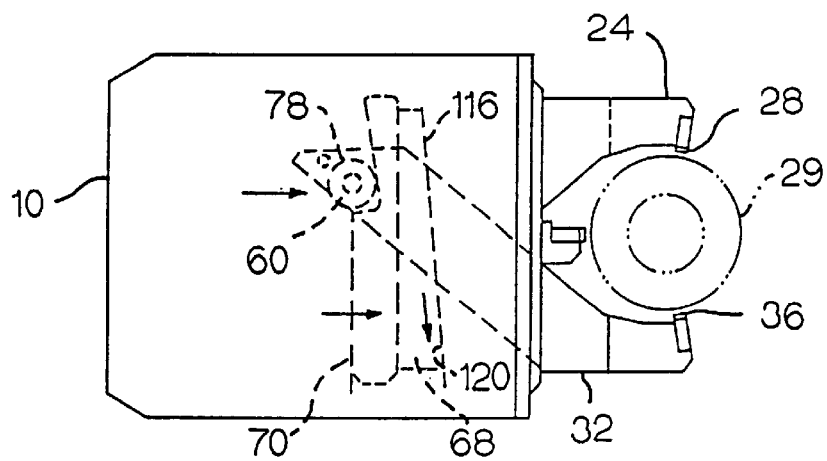
FIGS. 12 and 13 are diagrams illustrating the motion of the gripping arms for making a vertical adjustment.
Figure 13:
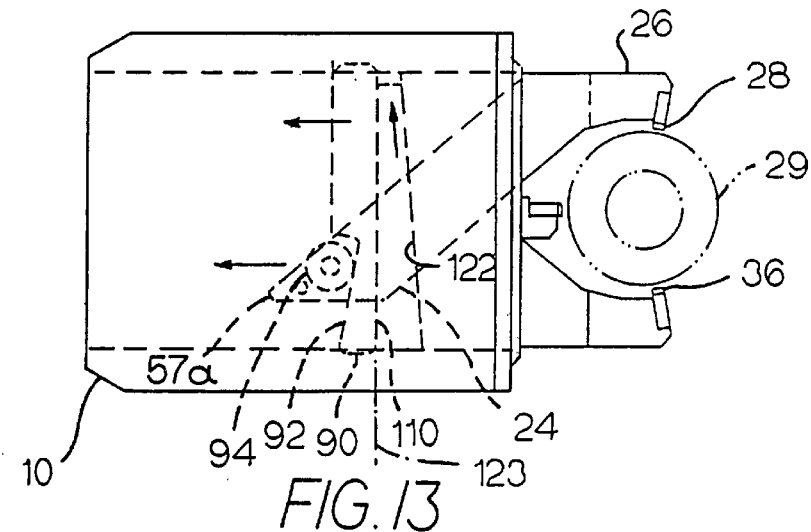

Referring to FIGS. 4, 12 and 13, when horizontal-adjusting guides 70 and 90 are being vertically adjusted, the adjacent vertically-adjusting guides 68 and 110 remain stationary.

A threaded drive screw 112 is mounted on side plate 12 and engages the upper end of guide 110. A rocker 114, mounted adjacent the lower end of guide 110 engages guide 68, mounted in side plate 14. Drive screw 112 can be adjusted vertically as viewed in FIG. 4, moving vertical-adjusting guide 110 down against rocker 114. Rocker 114 pushes the other vertical-adjusting guide 68 up against the bias of a spring 118. A screw 119 mounted in side plate 14 seats the spring in position.

Guides 68 and 110 are slidably mounted on camming surfaces 120 and 122 of their respective camming slots, inclined the same direction with respect to the axis of motion of body 20. As a result, both cam rollers will move their respective wear pads the same horizontal distance.

Guides 90 and 110 are slidable along a plane 123 which is perpendicular to the axis of motion of body 20. When guides 68 and 110 are being vertically adjusted, the horizontal-adjusting guides remain stationary.

When one of the vertical-adjusting guides 68 or 110, as viewed in FIG. 13, is moved downwardly, it causes the associated gripping arm to move forward before the other gripping arm because the vertically adjusting guides move in opposite directions. Consequently, upper arm 24 as viewed in FIG. 13 will not move as far forward when the cam roller 94 contacts camming surface 92 in guide 90.

Referring to FIG. 14, each of the wear pads has a work contact surface that is tangent to the cylindrical surface of the workpiece. This arrangement permits the change in the direction of the original workpiece center to be moved from position "E" to a new center position "F", providing a vertical adjustment in the center of the workpiece. Moving drive screw 112 in the opposite direction causes the new workpiece center to be relocated in the opposite vertical direction from the original center.

Thus, I have described an improved internal means for adjusting the wear pads of a steady rest both horizontally and vertically.

Having described my invention, I claim:

1. A true centering steady rest for supporting a rotatable, cylindrical workpiece, comprising:
   a housing;
   an arm-supporting body slidably disposed within said housing along an axis of motion toward a workpiece;
   a first support arm slidably mounted on the arm-supporting body in a first plane forming an acute angle with said axis of motion;
   a first workpiece contact member mounted on the first support arm for motion therewith toward a first work contact position;
   a second support arm slidably mounted on the arm-supporting body in a second plane forming an acute angle with said axis of motion;
   a second workpiece contact member mounted on the second support arm for motion therewith toward a second work contact position; and
   a third workpiece contact member mounted on the arm-supporting body for engaging a workpiece in a third work contact position;
   cam means mounted in the housing for adjusting the contact position of the first workpiece contact member, comprising:
      a vertical-adjusting guide member movably mounted in the housing, and camming structure moveable with the vertical-adjusting guide member, the camming structure having a camming surface with a camming contour;
      a cam follower carried on the first support arm, and engageable with said camming surface, the cam follower being movable along said camming surface as the arm-supporting body is moved along said axis of motion, to move the first workpiece contact member toward said first work contact position, along a path of motion defined by the contour of the camming surface;
      first vertical-adjusting structure mounted in the housing and engaged with the vertical-adjusting guide member for moving said camming surface and said first work contact position in a direction transverse to said axis of motion; and
      power means for slidably moving said arm-supporting body along said axis of motion to move said first workpiece contact member, said second workpiece contact member and said third workpiece contact member in a multi-point engagement on the workpiece.

2. A steady rest as defined in claim 1, including a second vertical-adjusting guide member movably mounted in the housing, and second camming structure with a camming contour movable with the second vertical-adjusting guide member, the camming structure of the second guide member having a second camming surface with a camming contour;
   a second cam follower carried on the second support arm, and engageable with the camming surface of said second camming structure as the arm-supporting body is moved along said axis of motion, to move the second workpiece contact member toward said second work contact position along a path of motion defined by the camming contour of the second camming structure; and
   rocker structure engaging the first mentioned vertical-adjusting guide member and the second vertical-adjusting guide member to move the second workpiece contact position in a direction transverse to said axis of motion as the first-vertical adjusting structure is being moved in a direction transverse to said axis of motion.

3. A steady rest as defined in claim 2, in which the first mentioned vertical-adjusting guide member and the second vertical-adjusting guide member are disposed in the housing on opposite sides of the arm-supporting body, and the first support arm and the second support arm are mounted on opposite sides of the arm-supporting body and disposed for slidable motion in planes disposed at about 45° with respect to said axis of motion and about 90° with respect to one another.

4. A steady rest as defined in claim 1, in which the cam follower comprises a cam roller.

5. A steady rest as defined in claim 1, in which the first vertical-adjusting structure comprises a threaded member mounted on the housing.

6. A steady rest as defined in claim 1, including;
   a horizontal-adjusting guide member movably mounted in the housing and engaged with the vertical adjusting guide member; and
   second adjusting structure mounted in the housing and engaged with the horizontal-adjusting guide member for moving said camming surface and said first work contact position in a direction along said axis of motion.

7. A steady rest for supporting a rotatable, cylindrical workpiece, comprising:
   a housing;
   an arm-supporting body disposed within said housing, said arm-supporting body being slidable within said housing along a horizontal axis of motion toward a workpiece;
   a first support arm slidably mounted on the arm-supporting body in a first plane forming an acute angle with said axis of motion;
   a first workpiece contact member mounted on the first support arm for motion therewith toward a first work contact position;
   a second support arm slidably mounted on the arm-supporting body in a second plane forming an acute angle with said axis of motion;

a second workpiece contact member mounted on the second support arm for motion therewith toward a second work contact position;

a third workpiece contact member mounted on the arm-supporting body for engaging a workpiece in a third work contact position;

cam means mounted in the housing for adjusting the workpiece contact positions of the first workpiece contact member and the second workpiece contact member either vertically or parallel to said axis of motion, comprising:

a first guide member movably mounted in the housing, and first camming structure movable with the first guide member, the first camming structure having a camming surface with a contour;

a first cam follower carried on the first support arm, and engageable with the camming surface of the first camming structure as the arm-supporting body is moved along said axis of motion, to move the first workpiece contact member toward said first work contact position;

first adjusting structure mounted on the housing and engaged with the first guide member for moving said camming surface and said first work contact position in a direction transverse to said axis of motion;

a second guide member movably mounted in the housing, and second camming structure movable with the second guide member, the second camming structure having a camming surface with a contour;

a second cam follower carried on the second support arm, and engageable with the camming surface of the second camming structure as the arm-supporting body is moved along said axis of motion, to move the second workpiece contact member to said second work contact position;

a first rocker structure engaging the first guide member and the second guide member to move the second workpiece contact position in a direction transverse to said axis of motion as the first adjusting structure is moving said first guide member;

a third guide member movably mounted in the housing, and third camming structure movable with the third guide member, the third guide member being movable with either the first guide member or the second guide member;

second adjusting structure mounted on the housing and engaged with the third guide member for moving the work contact position of the third guide member in a direction parallel to said axis of motion; and power means for slidably moving said arm-supporting body along said axis of motion to move said first workpiece contact member, said second workpiece contact member and said third workpiece contact member in a multi-point engagement on a cylindrical workpiece.

8. A steady rest as defined in claim 7, in which the first guide member, and the third guide member are mounted in a side-by-side sliding relationship.

9. A steady rest as defined in claim 7, in which the first support arm and the second support arm are mounted in a crisscross arrangement on the arm-supporting body.

10. A steady rest as defined in claim 7, in which each of said work contact members has a planar work contact surface for engaging a cylindrical workpiece surface.

\* \* \* \* \*